United States Patent
Chan et al.

(10) Patent No.: US 10,676,065 B2
(45) Date of Patent: Jun. 9, 2020

(54) DETECTOR, SYSTEM AND METHOD FOR DETECTING VEHICLE LOCK STATUS

(71) Applicant: King Bong Wong, Hong Kong (HK)

(72) Inventors: Lak Wang Chan, Hong Kong (HK); King Bong Wong, Hong Kong (HK)

( * ) Notice: Subject to any disclaimer, the term of this patent is extended or adjusted under 35 U.S.C. 154(b) by 0 days.

(21) Appl. No.: 16/199,200

(22) Filed: Nov. 25, 2018

(65) Prior Publication Data
US 2019/0299928 A1 Oct. 3, 2019

Related U.S. Application Data

(63) Continuation of application No. PCT/CN2018/080782, filed on Mar. 28, 2018.

(51) Int. Cl.
| | |
|---|---|
| *B60R 25/20* | (2013.01) |
| *B60R 25/10* | (2013.01) |
| *B60R 25/30* | (2013.01) |
| *G06K 9/62* | (2006.01) |
| *G06N 20/00* | (2019.01) |

(52) U.S. Cl.
CPC ...... *B60R 25/2009* (2013.01); *B60R 25/1006* (2013.01); *B60R 25/1018* (2013.01); *B60R 25/302* (2013.01); *G06K 9/62* (2013.01); *G06N 20/00* (2019.01); *B60R 2025/1016* (2013.01); *B60R 2325/101* (2013.01); *B60R 2325/205* (2013.01)

(58) Field of Classification Search
CPC ............ B60R 25/2009; B60R 25/1006; B60R 25/1018; B60R 25/302; B60R 2025/101; B60R 2325/101; B60R 2325/205; G06N 20/00; G06K 9/62

USPC ...................................................... 340/539.1
See application file for complete search history.

(56) References Cited

U.S. PATENT DOCUMENTS

| | | | | |
|---|---|---|---|---|
| 6,593,848 | B1* | 7/2003 | Atkins, III | G08B 13/1672 340/425.5 |
| 9,592,795 | B1* | 3/2017 | Whiteside | B60R 25/305 |
| 9,822,553 | B1* | 11/2017 | Ho | E05B 47/0012 |
| 2005/0074131 | A1* | 4/2005 | McCall | H04R 5/02 381/86 |
| 2012/0316774 | A1* | 12/2012 | Yariv | G01C 21/26 701/423 |
| 2013/0073338 | A1* | 3/2013 | Kolpasky | G06Q 30/01 705/7.32 |

(Continued)

*Primary Examiner* — Omar Casillashernandez
(74) *Attorney, Agent, or Firm* — W&K IP

(57) ABSTRACT

A detector, system and method for detecting vehicle lock status are provided. The detector comprises a motion sensor configured to sense vehicle door open and close movement; a microphone configured to record sound patterns generated with targeted events; a wireless communication module; a memory for storage; a battery for supplying power; and a controller connected to the motion sensor, microphone, wireless communication module, memory and battery respectively and configured to switch on or off the microphone and the wireless communication module according to signals provided by the motion sensor, and control the wireless communication module to transmit sound files wirelessly. The detector is designed and sized to be attached to the vehicle door. The detector is easy to use, easy to install, yet affordable for detecting the lock status of the vehicle and show the lock status on the driver's smart phone even if he/she has walked away.

12 Claims, 3 Drawing Sheets

(56) References Cited

U.S. PATENT DOCUMENTS

| | | | |
|---|---|---|---|
| 2013/0103200 A1* | 4/2013 | Tucker | G01C 21/206 |
| | | | 700/275 |
| 2015/0195647 A1* | 7/2015 | Srinivasan | H04R 3/002 |
| | | | 381/71.4 |
| 2016/0232763 A1* | 8/2016 | Sockol | G08B 13/19619 |
| 2017/0178664 A1* | 6/2017 | Wingate | G10L 21/028 |
| 2018/0367731 A1* | 12/2018 | Gatti | H04N 5/23238 |
| 2019/0018411 A1* | 1/2019 | Herbach | H04N 7/183 |
| 2019/0152433 A1* | 5/2019 | Cumbo | B60R 25/01 |

* cited by examiner

DETECTOR, SYSTEM AND METHOD FOR DETECTING VEHICLE LOCK STATUS

CROSS-REFERENCE TO RELATED APPLICATIONS

This application is a continuation of International Patent Application No. PCT/CN2018/080782 with a filing date of Mar. 28, 2018, designating the United States, now pending. The content of the aforementioned applications, including any intervening amendments thereto, are incorporated herein by reference.

FIELD OF THE INVENTION

The present invention relates to the field of vehicle accessories, and more particularly to a vehicle lock detector attached to the vehicle door, a system and method for detecting the lock status of the vehicle.

BACKGROUND OF THE INVENTION

If you are a driver, for example a car driver, you may have experienced the following car lock syndrome. After locking the car and walk away from the car, you start question yourself—Did I lock my car! This problem is very common with all car drivers as the door lock status does not show with his car lock key. Not to mention people with Obsessive Compulsive Disorder (OCD) which is a mental disorder where people feel the need to check things repeatedly.

Some solutions use the OBD (On Board Diagnostic) interface to connect the car system to get signal and status of the car conditions, e.g. mileage, battery condition, driving distance etc. These electronic gadgets are difficult to install and operate and also expensive.

There is no simple and economical way to know whether you have locked the car. Often time, driver needs to walk a long way back and double check whether the car is actually locked.

There is a need to invent an easy to use, easy to install, yet affordable Vehicle

SUMMARY OF THE INVENTION

For the defects in the prior art, an object of the present invention is to provide a vehicle lock detector which is easy to use, easy to install, yet affordable for detecting the lock status of the vehicle and show the lock status to the driver even if he/she has walked away. It is also an object of the present invention to provide a system and method which are easy to use and affordable for detecting the lock status of the vehicle.

The technical solutions of the present invention are as follows:

In one aspect, a detector for detecting vehicle lock status is provided, which comprises: a motion sensor configured to sense vehicle door open and close movement; a microphone configured to record sound patterns generated with targeted events; a wireless communication module; a memory for storage; a battery for supplying power; and a controller connected to the motion sensor, microphone, wireless communication module, memory and battery respectively and configured to switch on or off the microphone and the wireless communication module according to signals provided by the motion sensor, and control the wireless communication module to transmit sound files wirelessly; the detector is designed and sized to be attached to the vehicle door for sensing the vehicle door open and close movement.

Advantageously, the motion sensor, the wireless communication module, the memory and the controller are integrated in a system-on-chip.

Advantageously, the wireless communication module is a Bluetooth, Wi-Fi, or Wireless Wide Area Network communication module.

Advantageously, the targeted events comprise remote key lock open and close, open and close of car door, side mirror and engine, and set and release movements of parking brake, thus the detector is further capable of detecting status of the side mirror, engine and parking brake.

In another aspect, a system for detecting vehicle lock status is provided, which comprises: a detector designed and sized to be attached to a vehicle door for detecting vehicle lock status, wherein the detector comprises: a motion sensor configured to sense vehicle door open and close movement; a microphone configured to record sound patterns generated with targeted events; a wireless communication module; a memory for storage; a battery for supplying power; and a controller connected to the motion sensor, microphone, wireless communication module, memory and battery respectively and configured to switch on or off the microphone and the wireless communication module according to signals provided by the motion sensor, and control the wireless communication module to transmit sound files wirelessly; and a smart phone for wirelessly receiving the sound files from the detector and displaying the vehicle lock status, wherein the smart phone is installed with a software application for processing the sound files, detecting sound patterns to identify events and determining the vehicle lock status.

Advantageously, the motion sensor, the wireless communication module, the memory and the controller are integrated in a system-on-chip.

Advantageously, the wireless communication module is a Bluetooth, Wi-Fi, or Wireless Wide Area Network communication module.

Advantageously, the targeted events comprise remote key lock open and close, open and close of car door, side mirror and engine, and set and release movements of parking brake, thus the detector is further capable of detecting status of the side mirror, engine and parking brake.

Advantageously, the system further comprises cloud services for storing the software application and sound pattern samples which can be downloaded to the smart phone.

Advantageously, the software application is configured to be capable of enabling the smart phone record sound pattern samples directly.

Advantageously, the software application comprises a labeled sound dataset and a machine learning network; the dataset is a collection of different sound files with event information by vehicle manufacturer, vehicle model, year of production, users and samples; and the training of the network is a process feeding the dataset as input into the network and predicting output with high accuracy to the dataset's label.

Advantageously, each sound file is pre-processed and transformed into other data format suitable for training; in the training process, transformed dataset is further divided into a training, validation and testing set; the training set is for training of the machine learning network, the validation set is for fine tuning the network's hyper parameter to avoid overfitting and the testing set is to check the performance of the network.

In yet another aspect, a method for detecting vehicle lock status is provided, which comprises: recording sound patterns after vehicle door open or close movement is sensed; transmitting sound files wirelessly; and wirelessly receiving and processing the sound files, detecting sound patterns to identify events, determining the vehicle lock status and displaying the vehicle lock status.

Advantageously, the method further comprises: collecting different sound files with event information by vehicle manufacturer, vehicle model, year of production, users and samples as a labeled sound dataset; pre-processing and transforming each sound file into other data format suitable for training; and training a machine learning network by feeding the dataset as input into the network and predicting output with high accuracy to the dataset's label.

Advantageously, in the training process, transformed dataset is further divided into a training, validation and testing set; the training set is for training of the machine learning network, the validation set is for fine tuning the network's hyper parameter to avoid overfitting and the testing set is to check the performance of the network.

The vehicle lock detector disclosed in the present disclosure is easy to use, easy to install, yet affordable for detecting the lock status of the vehicle and show the lock status to the driver even if he/she has walked away. The system and method are easy to use and affordable for detecting the lock status of the vehicle.

DETAILED DESCRIPTION OF THE EMBODIMENTS

Figure 1:
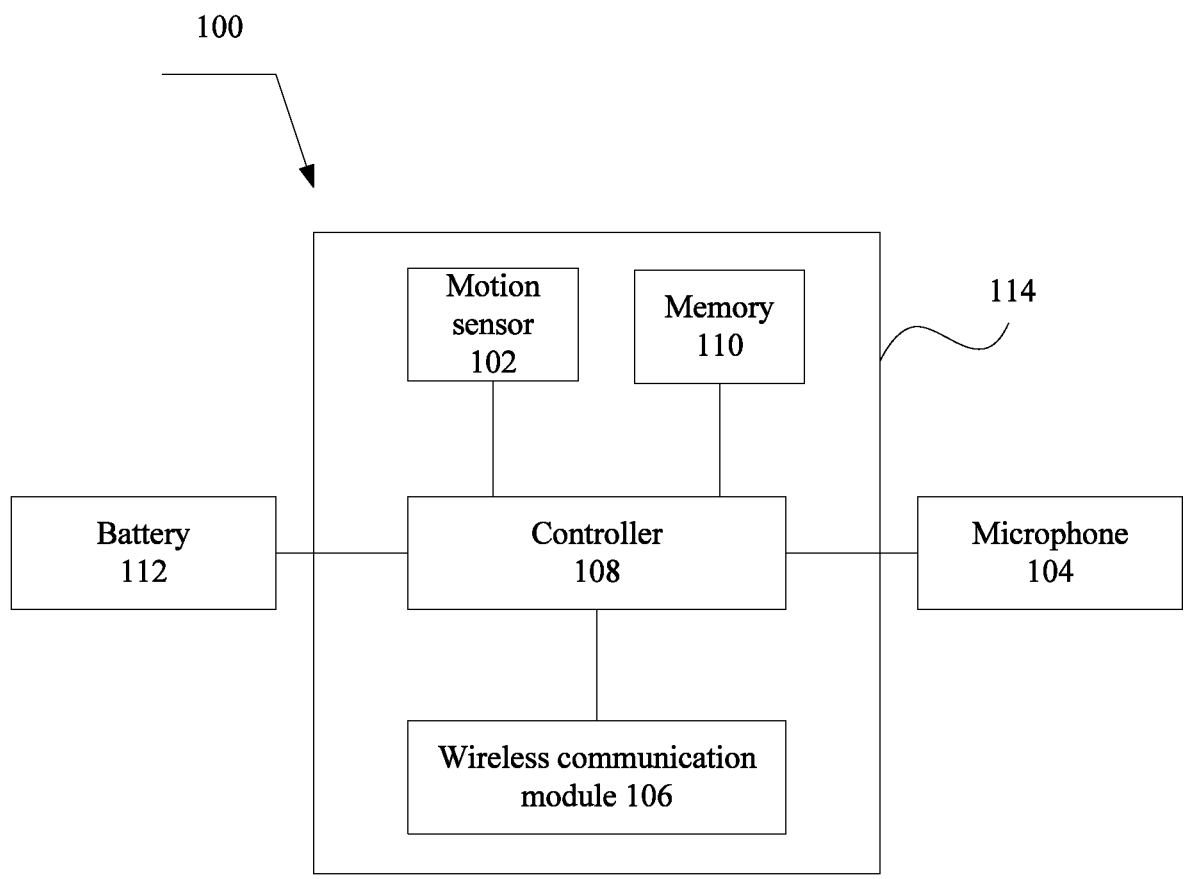
FIG. 1 is a schematic view of a vehicle lock detector according to the present invention.

The present invention will now be more particularly described, by way of example only, with reference to the accompanying drawings. It should be understood that the drawing are for better understanding and should not limit the present invention. Dimensions of components and features shown in the drawings are generally chosen for convenience and clarity of presentation and are not necessarily shown to scale.

This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the disclosure. Additionally, some terms used in this specification are more specifically defined below.

Vehicle Lock Detector (VLD)

Every vehicle, for example car, when being locked or opened by a remote key lock device, will generate a distinct mechanical sound by the locking mechanism. If you seat inside the car cabinet, close all the doors and windows, and press the remote key lock with open and close action, you can hear these sounds very clearly and crispy. The same case for starting the engine, turn off the side mirror, close the door, open the door etc. Each of these sounds has a very unique sound pattern and even can be distinguished by normal human hearing.

The present disclosure utilizes the sound patterns recorded inside the car cabinet to analyze the sequence of events and determine whether the car is locked or unlocked by the remote or manual key lock device and the notification will be sent to the driver wirelessly, for example to driver's smart phone through Bluetooth communication or other suitable wireless communication.

To illustrate, we can use the following sound pattern as an event sequence (assuming this is a left-driving car with driver seat at the right hand side):

(1) Driver arrives carpark:
-Switch off side mirror (M2);
-Switch off the engine (E2);
-Open car driver right door (D1);
-Close car driver right door (D2);
-Press remote key to lock the car doors (S2);
Event sequence=M2-E2-D1-D2-S2.

(2) Driver leaves the carpark:
-Press remote key to open car doors (S1);
-Open car driver right door (D1);
-Seat on driver seat;
-Start engine (E1);
-Close car driver right door (D2);
-Switch on side mirror (M1);
Off the car parking brake (P);
-Press gas to start moving the car (G);
Event sequence=S1-D1-E1-D2-M1-P-G.

In normal case, car driver will follow these event sequences every day to open and close the doors of his car. The vehicle lock detector utilizes these event sequences to determine whether the car is successfully locked while the owner leaving the car. With the vehicle lock detector, the driver will have notification of car lock status with timer to his smart phone every time when he leaves his car from parking lot. He doesn't need to walk back to his car again to double check whether the car is properly locked.

Other than knowing the car lock status, it can also detect side mirror and parking brake status.

Referring to FIG. 1, the detector 100 for detecting vehicle lock status comprises: a motion sensor 102 configured to sense vehicle door open and close movement; a microphone 104 configured to record sound patterns generated with targeted events; a wireless communication module 106; a memory 110 for storage; a battery 112 for supplying power; and a controller 108 connected to the motion sensor 102, microphone 104, wireless communication module 106, memory 110 and battery 112 respectively and configured to switch on or off the microphone 104 and the wireless communication module 106 according to signals provided by the motion sensor 102, and control the wireless communication module 106 to transmit sound files wirelessly. The detector 100 is designed and sized to be attached to the vehicle door for sensing the vehicle door open and close movement.

Preferably, the wireless communication module 106 is a Bluetooth communication module. It should be understood that the wireless communication module may also adopt other suitable wireless communication, such as Wi-Fi, WWAN (Wireless Wide Area Network, 2G, 3G, 4G, data network). The motion sensor 102, the Bluetooth communication module 106, the controller 108 and the memory 110 are integrated in a system-on-chip (SOC) 114 so that the detector 100 is as a small box and can be directly attached to the vehicle door easily.

In normal case, the VLD is in sleep mode to save power for the device. The motion sensor 102 on the SOC 114 is switched on during sleep mode. Whenever the motion sensor 102 detects a motion (open or close), it will trigger the following tasks immediately:
 a) Switch on the Microphone;
 b) Switch on Bluetooth for pairing; and
 c) Continue sound recording and transmitting sound file to a smart phone, for example a smart phone, for a certain time, for example 2 minutes.

System for Detecting Vehicle Lock Status

Figure 2:
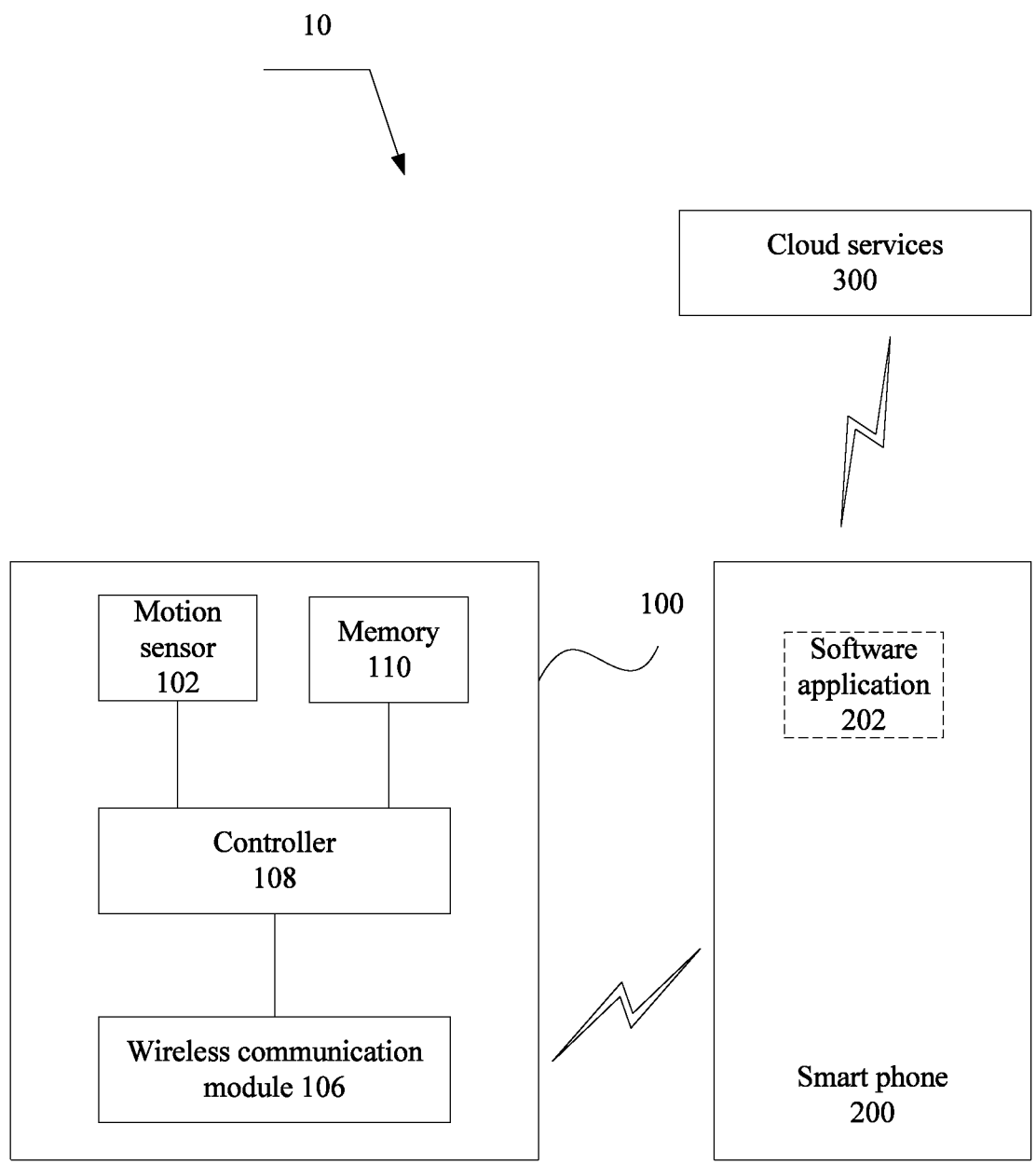
FIG. 2 is a schematic view of a system for detecting vehicle lock status.

Referring to FIG. 2, a system 10 for detecting vehicle lock status comprises: a detector 100 designed and sized to be attached to a vehicle door for detecting vehicle lock status, and a smart phone 200 for wirelessly receiving the sound files from the detector 100 and displaying the vehicle lock status. The detector 100 is described in detail above, which will not be repeated hear. The smart phone 200 is installed with a software application 202 for processing the sound files, detecting sound patterns to identify events and determining the vehicle lock status.

Preferably, the system 10 may further comprises cloud services 300 for storing the software application and sound pattern samples which can be downloaded to the smart phone 200. User needs to download a special program (App) from VLD Cloud Services 300 to his smart phone. The VLD App can process the sound file and detect sound patterns to identify the events. With the characteristic of sound patterns and event sequence, the software application can decide whether the car door is locked successfully.

The flowing steps illustrate the work flow of the system:
Assuming in the beginning of a day, the driver wants to drive his car from carpark:
 -Press remote key to open car doors (S1);
 -Open car driver right door (D1), (the motion sensor 102 senses swing):
  a) It will start Microphone to record sound patterns for a preset time, for example 2 minutes; and
  b) It will start Bluetooth pairing;
 -Seat on driver seat;
 -Start engine (E1);
 -Close car driver right door (D2);
 -Switch on side mirror (M1);
 -Off the car parking lock (P); and
 Press gas to start the car (G).

The sound file will be decoded as event sequence as: E1-D2-M1-P-G.

The software application cannot find event: S2. It concludes it is not a car locked event. A notification of car-not-locked event and the time of day clock will be sent to smart phone app for record purpose but no notification will be sent to alert driver.

When the driver returns to carpark, the following event sequence may be generated:
 -Switch off side mirror (M2);
 -Switch off the engine (E2);
 -Open car driver right door (D1), (the motion sensor 102 senses swing):
  a) It will start Microphone to record sound patterns for a preset time, for example 2 minutes; and
  b) It will start Bluetooth pairing;
 -Close car driver right door (D2); and
 -Press remote key to lock the car doors (S2) and walk away from car.

The sound file will be decoded as event sequence as: D2-S2. The software application will decode the events with S2 at the end of sound file. It will conclude it is a successful car lock event. A notification of car-locked and the time of day clock will be sent to the App of the smart phone and a notification will be displayed to indicate the car is locked successfully. Such record will be stored and can be retrieved from database at a later stage if user wants to check the door lock status again.

There are many sequence events that can happen:
 a) D2-S2-D1-E1-M2-E2-D1-D2
 It means the driver clocked the door; forget to switch off the side mirror, reopen the door, start the engine, switch off the mirror, switch off the engine, open and close the door (but forget to lock the door).
 b) D2-D1-D2-S2-S1
 It means the driver opens the rear door and grips something then closes the door and lock the door by remote key, but accidentally press the open door key again and he don't know.

As long as the sound file consists the S2 and does not have a S1 following S2, it is safe to conclude the car door is locked successfully.

Since the Bluetooth has paired the VLD and the smart phone, the sound file being recorded will be sent continuously without waiting until the end of file. In general, Bluetooth effective ranges of wireless connection between devices are around 10 meters. In order to save power, the following conditions will force the VLD to go to sleep mode: i) when time of sound recording exceeds a time interval e.g. 2 minutes etc., or ii) when the Bluetooth signal is detected broken between the VLD and the smart phone (it means the user has walked a distance over 10 meters away from the car; and it indicates user has left the car and expects the car door is locked properly).

Sound Pattern Samples Acquisition

There are two methods to create sound pattern samples for the App/algorithm to understand the events of a designed car:
Selected events are as follows:
 -Car door open (D1);
 -Car door close (D2);
 -Remote key lock open (S1);
 -Remote key lock close (S2);
 -Engine start (E1);
 -Engine stop (E2);
 -Side mirror open (M1);
 -Side mirror close (M2);
 -Car parking brake set (P1); and
 -Car parking brake release (P2).

a) Method 1—Recording Sound Samples Directly from the Designated Car with Smart Phone:

The software application is configured to be capable of enabling the smart phone record sound pattern samples directly. The APP comes with software module for recording. It will show these events one by one on the smart phone and ask user to select and start recording. It will take a very short interval per event e.g. 2 seconds etc. Each event is required to be recorded a number of times e.g. 50 times etc. in order to achieve an adequate sample size for the algorithm to recognize the sound patterns accurately. User can repeat this process to align and update the sound patterns file to reflect the tear and wear that will change the sound of the event patterns.

b) Method 2—Big Data with VLD Cloud Services

Each car has its maker, model, and year of purchase e.g. Toyota, Rav4, 2014. Similar sound patterns are expected from the same maker/model/year. The App will request new user to provide these maker/model/year information during their installation and registration process. It will be uploaded and stored with VLD cloud services 300. The event file of this user will be stored and categorized by different car maker, model and year. Every time the user retrains the events for his/her car, the event file will be sent to VLD cloud services 300 to update the master file. This arrangement will allow VLD Cloud services 300 to store the entire car community sound events by maker, model and year. When the population of the database is big enough, new user can simply download the event file of their car matching the same maker/model/year and can use the VLD immediately without sound event training. It will become a plug and play device for car owner.

It should be understood that initially, the detector is not so smart, because it will be smarter as he uses it many times. Every time, they use the detector, the recorded events sound files will send to the cloud services 300. The more they use, the smarter the detector will be. So as user grows, the detector becomes smarter.

Sound Processing and Recognition

The software application 202 comprises a labeled sound dataset and a machine learning network. In general, the sound processing and recognition algorithm is based on the labeled sound dataset and a machine learning network. The training of the network is the process feeding dataset as input into the network and predicting output with high accuracy to the dataset's label. A well-trained network is able to process new sound information and predict with the correct label.

For vehicle lock application, the dataset is a collection of different sound files with events information, e.g. S1, S2, E1, E2 and etc., by car manufacturer, car model and year of production, and by users and samples. The following illustrates the concept of dataset by table format.

overfitting and testing set is to check the performance of the network, i.e. accuracy of the recognition. A well-trained network is the "prediction network", i.e. the sound recognition algorithm where sound file as input and event as output.

In terms of vehicle lock application, there are "prediction network" pre-trained per vehicle manufacturer+model (net-m) and manufacturer+model+year (net-y). When recognizing new sound, net-m is used by default. For example, the sound from TOYOTA-RAV4 will use prediction network trained via TOYOTA-RAV4 data segmentation. It is optional to use net-y which means recognition is based on a particular production year of a car model.

Contrary to the sound file in dataset where each file associates only one labeled event, natural sound is by nature a continuous stream of information. Captured sound stream will be divided into sound frames with time overlapping. In case of 2 sec long and 80% overlapping, sound stream will be divided into frames of 2 sec long with 1.6 sec time overlapping with the previous frame. Each frame will be transformed similar to transforming labeled dataset and feed into selected "prediction network". Network output is a series of sound event in text format. Thus, different vehicle events with its own distinct sound pattern can be recognized like simple and distinct text characters.

Method for Detecting Vehicle Lock Status

Figure 3:
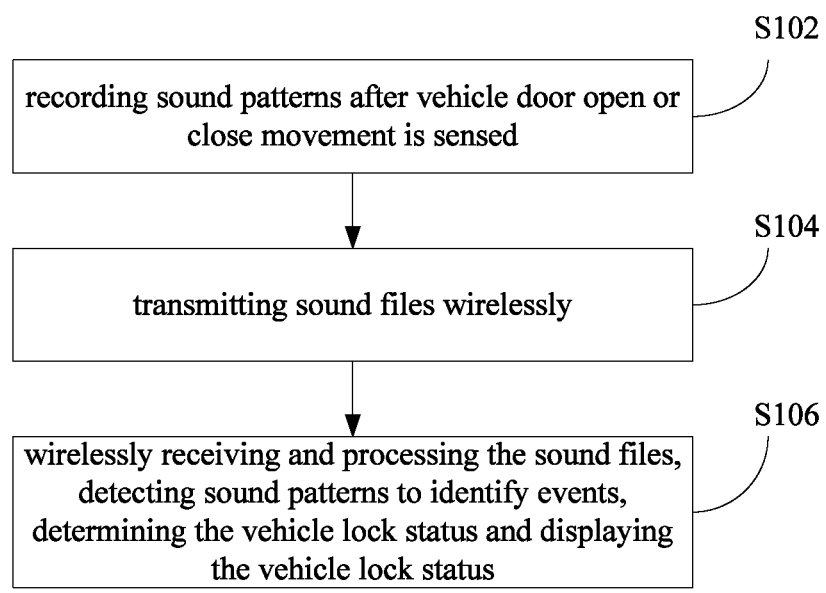
FIG. 3 is a flow chat of a method for detecting vehicle lock status.

Referring to FIG. 3, a method for detecting vehicle lock status comprises the following steps:

Step 102, recording sound patterns after vehicle door open or close movement is sensed;

Step 104, transmitting sound files wirelessly; and

Step 106, wirelessly receiving and processing the sound files, detecting sound patterns to identify events, determining the vehicle lock status and displaying the vehicle lock status.

Preferably, the method may further comprise the following steps:

collecting different sound files with event information by vehicle manufacturer, vehicle model, year of production, users and samples as a labeled sound dataset;

TABLE 1 labeled sound dataset

| Manufacturer | Model | Year | Sound event | User | Sample | Sound file |
|---|---|---|---|---|---|---|
| TOYOTA | RAV4 | 2010 | S1 | ALEX | 001 | TOYOTA/RAV4/2010/S1-ALEX-001.dat |
| TOYOTA | RAV4 | 2010 | S1 | ALEX | 002 | TOYOTA/RAV4/2010/S1-ALEX-002.dat |
| ... | ... | ... | ... | ... | ... | ... |
| TOYOTA | RAV4 | 2010 | S1 | ALEX | 020 | TOYOTA/RAV4/2010/S1-ALEX-020.dat |
| TOYOTA | RAV4 | 2010 | S2 | ALEX | 001 | TOYOTA/RAV4/2010/S2-ALEX-001.dat |
| TOYOTA | RAV4 | 2010 | S2 | ALEX | 002 | TOYOTA/RAV4/2010/S2-ALEX-002.dat |
| ... | ... | ... | ... | ... | ... | ... |
| TOYOTA | RAV4 | 2010 | S2 | ALEX | 022 | TOYOTA/RAV4/2010/S2-ALEX-022.dat |
| ... | ... | ... | ... | ... | ... | ... |

All sound files have the same duration of recording, e.g. 2 seconds. Each sound file is pre-processed and transformed into other data format suitable for training. There are many possible type of pre-processing. One typical way is to transform the sound into spectrogram similar to an 2D image where x-axis is the time, y-axis is the frequency and the pixel intensity is the amplitude.

In the training process, transformed dataset is further divided into training, validation and testing set. Training set is for training of the machine learning network, validation set is for fine tuning the network's hyper parameter to avoid pre-processing and transforming each sound file into other data format suitable for training; and training a machine learning network by feeding the dataset as input into the network and predicting output with high accuracy to the dataset's label.

In the training process, transformed dataset is further divided into a training, validation and testing set; the training set is for training of the machine learning network, the validation set is for fine tuning the network's hyper parameter to avoid overfitting and the testing set is to check the performance of the network.

Although the invention is described with reference to one or more preferred embodiments, it should be appreciated by those skilled in the art that various modifications are possible. Therefore, the scope of the invention is to be determined by reference to the claims that follow.

We claim:

1. A detector for detecting vehicle lock status, comprising:
   a motion sensor configured to sense vehicle door open and close movement;
   a microphone configured to record sound patterns generated with targeted events;
   a wireless communication module;
   a memory for storage;
   battery for supplying power; and
   a controller connected to the motion sensor, microphone, wireless communication module, memory and battery respectively and configured to switch on or off the microphone and the wireless communication module according to signals provided by the motion sensor, and control the wireless communication module to transmit sound files wirelessly;
   wherein the detector is designed and sized to be attached to the vehicle door for sensing the vehicle door open and close movement;
   wherein the targeted events comprise remote key lock open and close, open and close of car door, side mirror and engine, and set and release movements of parking brake, thus the detector is further capable of detecting status of the side mirror, engine and parking brake.

2. The detector of claim 1, wherein the motion sensor, the wireless communication module, the memory and the controller are integrated in a system-on-chip.

3. The detector of claim 1, wherein the wireless communication module is a Bluetooth, Wi-Fi, or Wireless Wide Area Network communication module.

4. A system for detecting vehicle lock status, comprising:
   a detector designed and sized to be attached to a vehicle door for detecting vehicle lock status, wherein the detector comprises:
   a motion sensor configured to sense vehicle door open and close movement;
   a microphone configured to record sound patterns generated with targeted events;
   a wireless communication module;
   a memory for storage;
   a battery for supplying power; and
   a controller connected to the motion sensor, microphone, wireless communication module, memory and battery respectively and configured to switch on or off the microphone and the wireless communication module according to signals provided by the motion sensor, and control the wireless communication module to transmit sound files wirelessly; and
   a smart phone for wirelessly receiving the sound files from the detector and displaying the vehicle lock status, wherein the smart phone is installed with a software application for processing the sound files, detecting sound patterns to identify events and determining the vehicle lock status;
   wherein the targeted events comprise remote key lock open and close, open and close of car door, side mirror and engine, and set and release movements of parking brake, thus the detector is further capable of detecting status of the side mirror, engine and parking brake.

5. The system of claim 4, wherein the motion sensor, the wireless communication module, the memory and the controller are integrated in a system-on-chip.

6. The system of claim 4, wherein the wireless communication module is a Bluetooth, Wi-Fi, or Wireless Wide Area Network communication module.

7. The system of claim 4, further comprising cloud services for storing the software application and sound pattern samples which can be downloaded to the smart phone.

8. The system of claim 4, wherein the software application is configured to be capable of enabling the smart phone record sound pattern samples directly.

9. The system of claim 4, wherein the software application comprises a labeled sound dataset and a machine learning network; the dataset is a collection of different sound files with event information by vehicle manufacturer, vehicle model, year of production, users and samples; and the training of the network is a process feeding the dataset as input into the network and predicting output with high accuracy to the dataset's label.

10. The system of claim 9, wherein each sound file is pre-processed and transformed into other data format suitable for training; in the training process, transformed dataset is further divided into a training, validation and testing set; the training set is for training of the machine learning network, the validation set is for fine tuning the network's hyper parameter to avoid overfitting and the testing set is to check the performance of the network.

11. A method for detecting vehicle lock status, comprising:
   recording sound patterns after vehicle door open or close movement is sensed;
   transmitting sound files wirelessly; and
   wirelessly receiving and processing the sound files, detecting sound patterns to identify events, determining the vehicle lock status and displaying the vehicle lock status,
   the method further comprising:
   collecting different sound files with event information by vehicle manufacturer, vehicle model, year of production, users and samples as a labeled sound dataset;
   pre-processing and transforming each sound file into other data format suitable for training; and
   training a machine learning network by feeding the dataset as input into the network and predicting output with high accuracy to the dataset's label.

12. The method of claim 11, wherein in the training process, transformed dataset is further divided into a training, validation and testing set; the training set is for training of the machine learning network, the validation set is for fine tuning the network's hyper parameter to avoid overfitting and the testing set is to check the performance of the network.

* * * * *